July 19, 1960 K. E. ROLLEFSON 2,946,026

TUNED TRANSFORMER UNIT

Filed May 10, 1955

INVENTOR.

Karl E. Rollefson

BY: Olson & Trexler

Attys.

United States Patent Office 2,946,026

Patented July 19, 1960

2,946,026

TUNED TRANSFORMER UNIT

Karl E. Rollefson, Evanston, Ill., assignor to The Muter Company, Chicago, Ill., a corporation of Illinois Filed May 10, 1955, Ser. No. 507,338

4 Claims. (Cl. 333—78)

This invention is concerned with a tuned transformer unit of the type commonly used in radio frequency and intermediate frequency stages of radio receivers and the like.

Tuned transformer units are widely used, for instance in radio receivers, for interstage coupling. These units may be used in radio frequency stages, or in intermediate frequency stages, and commonly are spoken of as R.F. or I.F. transformers. These transformer units comprise inductively coupled primary and secondary windings and a tuning capacitor connected across each winding. It is conventional practice to provide for tuning the unit by making the capacitors adjustable, and by providing a screw threaded core of sintered powdered iron which can be adjusted in or out of the coils. The construction of such transformer units is expensive and requires expensive, skilled labor for tuning or aligning the radio receiver or other device in which such units are installed. Furthermore, these units are subject to detuning during use by vibration of the receiver or the like, or by owners or relatively unskilled servicemen. Adjustability heretofore has been necessary not only to compensate for variations in manufacture of the components of the transformer units, but also to compensate for the wiring of an individual electronic device. For instance, the wiring capacity between two stages in a simple radio receiver when wired in accordance with conventional practices may vary as much as seven to ten micromicrofarads.

I have found that it now is possible to eliminate substantially all of the defects of tuned interstage transformer units while attaining a great many new advantages by the use of fixed or nontunable interstage transformer units. Printed circuits now are widely used for the wiring in radio receivers and the like, and the variation in wiring capacity from one of these circuits to another is negligible. Accordingly, there need be no compensation for variation from one receiver or other electronic device to another of the same design. Furthermore, I have found that by electrically testing the transformer coils and dividing them into three groups, one of which is accurate within one or two percent of the desired result, a second of which is in error in one direction, and a third of which is in error in the opposite direction, and by similarly testing and dividing the capacitors to be used therewith, excellent results can be obtained by mating the low testing coils with the high testing capacitors and vice versa, and by mating the coils and capacitors which are accurate within the desired limits with one another.

It is an object of this invention to provide a tuned transformer unit which is extraordinarily economical to fabricate.

It is a further object of this invention to provide a tuned transformer unit needing no tuning or aligning after assembly in a radio receiving set or other electronic device.

It is yet another object of this invention to provide a tuned transformer unit for radio sets and the like having a greater uniformity from one transformer unit to another than heretofore has been attained on a commercial scale.

A further object of this invention is to provide a tuned transformer unit holding servicing costs to a minimum.

More specifically, it is an object of this invention to provide a tuned transformer unit wherein the inductively coupled coils, the tuning capacitors, and the cores or slugs are fixed in predetermined relation relative to one another.

Other objects and advantages of the present invention will be apparent from the following description when taken in connection with the accompanying drawings, wherein.

Figures 1, 2, 3, 4, 5, 6, 7, 8, 9, 10:
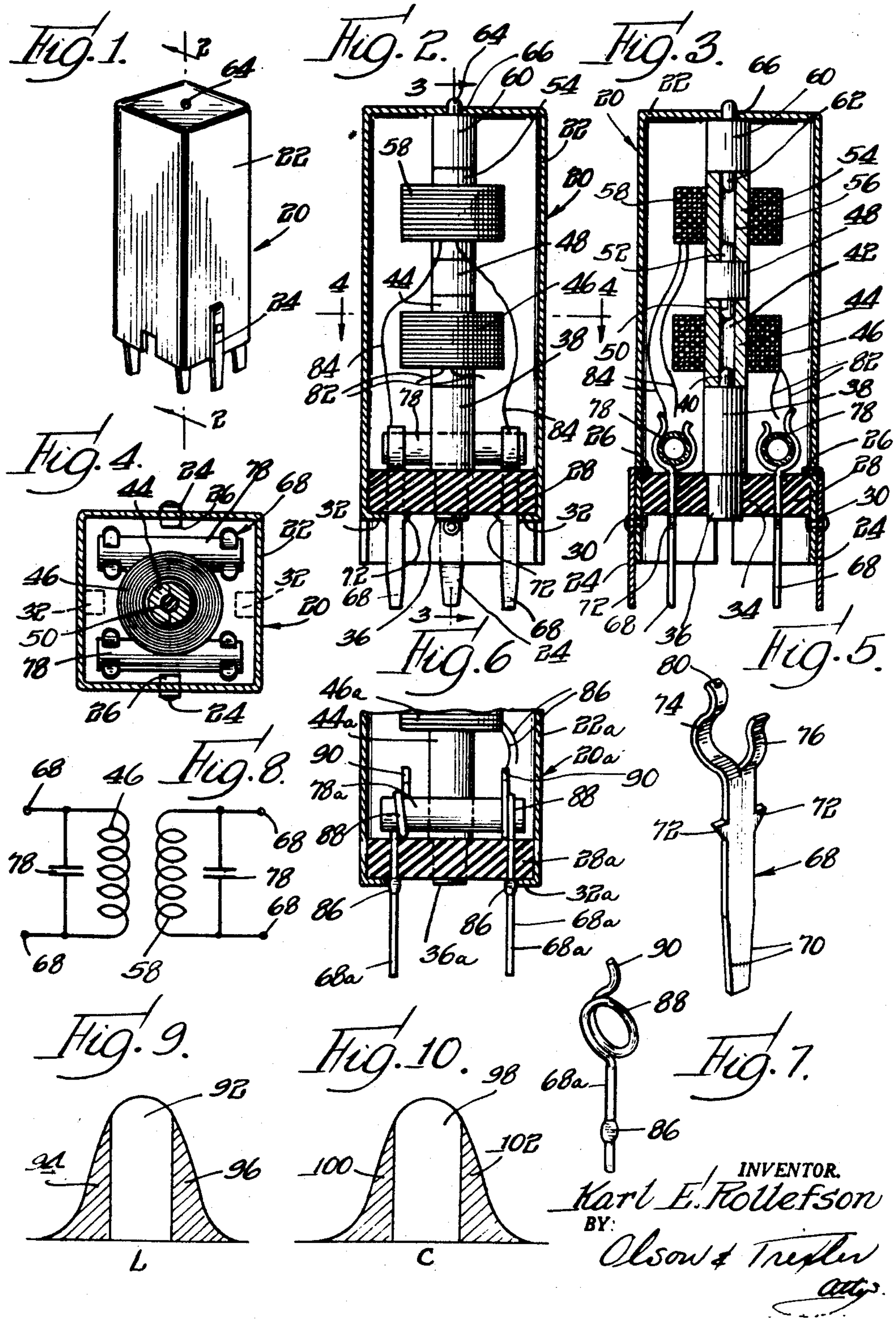
Fig. 1 is a perspective view of a tuned transformer unit in accordance with the principles of this invention.
Fig. 2 is a longitudinal sectional view thereof substantially along the line 2—2 in Fig. 1.
Fig. 3 is a longitudinal sectional view at right angles to Fig. 2 and substantially along the line 3—3 in Fig. 2.
Fig. 4 is a horizontal sectional view taken substantially along the line 4—4 in Fig. 2.
Fig. 5 is a perspective view of the terminal lug of the unit.
Fig. 6 is a fragmentary longitudinal sectional view showing a different type of terminal lug.
Fig. 7 is a perspective view of the terminal lug shown in Fig. 6.
Fig. 8 is a schematic wiring diagram of the tuned transformer unit.
Fig. 9 is a curve illustrating the separation of the coils in accordance with inductance.
Fig. 10 is a similar curve illustrating the separation of the capacitors in accordance with their capacity.

Referring now in greater particularity to the drawings, there will be seen a tuned transformer unit identified generally by the numeral 20, and comprising the usual rectangular aluminum shield can 22. The can is provided with a pair of mounting tabs or prongs 24 having turned over upper ends 26 which project through slots in the wall of the can generally near the bottom thereof into the interior of the can. These aid in holding the lugs, prongs, or tabs in proper position, and also serve to position an insulating base 28. The prongs 24 also are held in place by rivets 30 projecting through the prongs and through the sides of the can. These rivets preferably are of the hollow, tubular variety, and the prongs may be made of any suitable material, brass being considered a satisfactory example. Tongues 32 are struck out of the sides of the can and are bent up to underlie the insulating base 28 to determine the lower limit thereof. Preferably the prongs 24 and the tongues or tabs 32 are arranged on alternate walls of the can, there being two tongues and two prongs in the preferred embodiment. As will be understood, the prongs 24 extend down through suitable openings in a chassis and are twisted or bent thereafter to hold the can in proper position.

The insulating base 28 may be made of any suitable material such as plastic or fiber, and is provided with a central aperture 34 in which the reduced lower end 36 of a cylindrical spacer 38 is positioned. The cylindrical spacer 38 is provided at its upper end with a small protuberance or teat 40. The spacer 38 can be made of any suitable insulating material. Plastic would be suitable for this purpose, but it is contemplated that the most satisfactory material would be wood, inasmuch as wooden dowels of the proper size can be obtained quite inexpensively in commerce and need only have the ends turned down slightly to the configuration shown in the drawings. The reduced lower end 36 may form a press fit in the opening 34 in the base, and it preferably also is glued or cemented in this opening. In some intances it may be found desirable to place a metallic bushing or ferrule in the hole 34 for receiving the reduced lower end 36.

The protuberance 40 on the upper end of the spacer 38 is received in the axial bore 42 of a sintered powdered iron core 44 of conventional construction. The protuberance 40 forms a rather tight fit in the bore, and the parts preferably also are cemented together. A coil winding 46 is wound directly on the core 44 without the provision of the usual spacer. This is possible inasmuch as there is no relative movement between the coil and the core. The insulation on the wire is sufficient to insulate the wire from the iron core.

A second insulating spacer 48 is provided with protuberances or teats 50 and 52 at its lower and upper ends respectively, and the lower of these protuberances is received in the bore 42. The spacer 48 again may be made of plastic, but preferably is formed of wood, and the spacer preferably is cemented to the core 44.

A second core 54 having an axial bore 56 is placed on top of the spacer 48 with the protuberance 52 received in the bore 56, and preferably cemented therein. The core 54 is similar to the core 44 and preferably comprises sintered powdered iron. A coil 58 similar to the coil 46 is wound directly on the core 54. Both of the coils 46 and 58 preferably are held together by shellac or the like in accordance with conventional practice so that the turns of the coils will adhere to the cores and to one another.

A third spacer 60 which likewise preferably is made of wood is mounted on top of the core 54 and is provided with a lower protuberance or teat 62 projecting into the axial bore 56, and with an upper teat or protuberance 64 extending through a hole 66 in the top of the can 22. The spacer 60 preferably is made of wood similarly to the first two spacers and preferably is cemented to the core 54. It will be noted that in addition to the holding together of the cores and spacers by tight fits and by cements, the entire assembly is trapped between the insulating base 28 and the top of the can 22 so that the parts cannot possibly come apart after assembly.

The coils 46 and 58 are inductively coupled to one another. The coupling is controlled by the spacing of the cores 44 and 54, and this is determined by the length of the second spacer 48. This length is predetermined for any given radio receiver or other electronic device in which the transformer unit 20 is to be incorporated. The length of the spacer 38 is determined in accordance with physical space requirements in the bottom of the can, and the length of the third spacer is such as to cause the assembly to take up the entire space between the insulating base 28 and the top of the can 22.

The transformer unit further is provided with four attaching lugs 68 of similar construction. In the preferred form of the invention illustrated in Figs. 1–4 and as best seen in the perspective view of Fig. 5, each lug 68 includes a strip of metal tapering somewhat toward the lower end as at 70 and provided on opposite edges with outwardly extending teeth 72 which limit the upper positions of the lugs 68 in the base 28. The lugs project through suitable slots in the base, and the upper edges of the teeth 72 bear against the lower surface of the base.

The strip of metal forming each lug 68 is split longitudinally near its upper end to form a pair of leaves 74 and 76 which are deformed outwardly and then again inwardly to form substantially semicircular portions. Each of the leaves 74 and 76 of a given lug lies on the opposite side of a tubular condenser 78 near one end thereof. The tubular condensers 78 are of the well known type having a tubular ceramic core provided with a conductive coating on the inside and on the outside. The outer ends of the leaves are turned outwardly to facilitate assembly with the condensers or capacitors 78, and the end of the leaf 74 may be somewhat longer and may be provided with an aperture 80 for receiving a terminal lead. The coils 46 and 58 are provided with leads 82 and 84 respectively which are connected to the lugs 68 at the opposite ends of the capacitors, the leads from one coil obviously being connected to one capacitor, and the leads from the other coil being connected to the second capacitor. The leads preferably are soldered to the leaves of the lugs, and at the same time the lugs are soldered to the capacitors. Thus, only one soldering operation is necessary to interconnect the lugs, capacitors, and coils. It will be observed that the spreading of the leaves 74 and 76, which preferably is done after insertion of the lugs 68 through suitable slots in the base 28, prevents the lugs from moving downwardly relative to the base. Conventional solder connections will be made to the lugs in assembling the transformer unit with a radio receiver or the like as will be apparent to those skilled in the art.

A modification of the invention is shown in Figs. 6 and 7. The main portion of the invention remains the same as previously described, and similar numerals are used with the addition of the suffix *a*. Description of identical parts need not be repeated. The difference exhibited by the form of the invention shown in Figs. 6 and 7 over that previously shown and described is in the lugs 68*a*, each of which comprises a wire which preferably is of twenty gauge or heavier. Each wire projects through a suitable aperture in the base 28*a* and is provided below the base 28*a* with a flattened portion causing protuberances 86 to be swaged outwardly on opposite sides of the wire to limit the upward position thereof. The upper end of each wire 68*a* is wrapped around an end of a capacitor 78*a* as at 88, and the extreme upper end of each wire extends upwardly therefrom at 90. The terminal wires from the coils are connected to the upstanding extreme ends 90. A single soldering operation suffices to affix one of the lead wires to the end 90 and to solder the loop 88 to the end of the capacitor.

A schematic wiring diagram of the invention is shown in Fig. 8 wherein the coils are represented in conventional fashion at 46 and 58. These coils are juxtapositioned for inductive coupling, and the capacitors 78 are connected across the coils as heretofore has been illustrated. The terminal lugs are indicated at 68.

The method of selecting the coils and capacitors to be used together is illustrated in Figs. 9 and 10. After winding of a coil on a core or slug, and before assembly with the spacers, the coil is tested electrically to determine its inductance. A great number of coils from a quantity tested will be found to fall within plus or minus one or two percent of the desired inductance value as is indicated by the clear area 92 under the curve. A certain percentage will be found to be low in inductance by an amount greater than one or two percent as is illustrated by the shaded area 94 under the curve, while a substantially equal number will be found to be too high in inductance by an amount greater than one or two percent as is illustrated by the shaded area 96 under the curve. Similarly, in Fig. 10 a large number of the capacitors will be found to fall within plus or minus two percent of the desired value as is illustrated at 98 in the clear area under the curve, while some will be more than one or two percent low as is illustrated at 100, and an equal number will be greater than one or two percent high as is shown at 102 in the shaded area beneath the curve.

The low value coils from the shaded area 94 of the curve are connected in parallel with the high value capacitors from the shaded area 102, while the high value coils from the area 96 are combined with the low value capacitors from the area 100, and the intermediate value coils from the area 92 are combined with the intermediate value capacitors from the area 98. Since the frequency to which a parallel connected coil and capacitor is tuned is a function of the square root of the product of the inductance of the coil and the capacitor, it has been found that the high and low values connected as indicated above tend to counteract one another and all of the resulting combinations are properly tuned within one or two percent.

In assembling the parts constituting my invention, the cores with the coils wound thereon are assembled with the three spacers and with the base. The attaching lugs or prongs are assembled with the base and with the capacitors, and the capacitors then are soldered simultaneously to the lugs and to the leads from the coils. Finally, the aluminum cans are placed over the coils and capacitors to shield the tuned circuits.

Tubular capacitors have been shown in the combination inasmuch as they are especially adapted to the means of capacitor mounting illustrated, and inasmuch as more uniform capacity results are obtained from the tubular capacitors than is possible with flat capacitors.

Tuned transformer units constructed as indicated heretofore are substantially less expensive than the usual adjustable or tunable units. It is unnecessary to hire high priced help to tune or align the transformer units following assembly in a radio receiver or the like, and since no manual tuning is required, greater uniformity is secured. The device lasts longer than conventional devices since there are no movable connections to come loose or to cause misadjustment. Furthermore, no tuning ever is needed during servicing, and servicing costs thus are maintained at a minimum.

The powdered iron slugs or cores used herein are of generally conventional construction, and hence are inexpensive to obtain in commerce. The threading of the cores heretofore necessary has been quite expensive and difficult, and therefore considerable money is saved by leaving them unthreaded in accordance with this invention. Furthermore, since no tube is necessary for threading the slugs or cores relative to the windings, the windings are placed directly on the cores. This results in a unit having an extremely high "Q" or quality rating.

Since the iron cores or slugs are hollow, a large number of them can be placed on a mandrel, and coils simultaneously can be wound on all of the cores on the mandrel, thus saving a substantial amount of time and money in winding.

The specific examples of the invention herein shown and described are for purposes of illustration only. Various changes in structure will no doubt occur to those skilled in the art, and will be understood as forming a part of my invention insofar as they fall within the spirit and scope of the appended claims.

The invention is claimed as follows:

1. A tuned transformer unit comprising a first bare ferromagnetic slug, a second bare ferromagnetic slug, a first coil wound directly on said first slug and fixed in position relative thereto, a second coil wound directly on the second slug and fixed in position relative thereto, a plurality of separate insulating and non-magnetic mounting members fixed at the ends of said slugs and having abutment means engaging said slugs for positioning thereof in predetermined fixed relation with said coils in inductive relation, said separate insulating members alternating in stacked relationship with the bare ferromagnetic slugs, a pair of capacitors, means connecting one of said capacitors across one coil, and means connecting the other capacitor across the other coil.

2. A tuned transformer unit comprising a first bare ferromagnetic member, a second bare ferromagnetic member, a first coil wound directly on the first bare ferromagnetic member and fixed in position relative thereto, a second coil wound directly on the second bare ferromagnetic member and fixed in position relative thereto, separate insulating and non-magnetic mounting members joining said ferromagnetic members in predetermined spaced relation with said coils in inductive relation, said ferromagnetic members and said insulating and non-magnetic mounting means having complementary threadless projection and recess means for joining to one another, the separate insulating members alternating with the bare ferromagnetic members in stacked relationship, a pair of capacitors, means connecting one of said capacitors across one coil and means connecting the other capacitor across the other coil.

3. A tuned transformer unit as set forth in claim 2 wherein each ferromagnetic member has a threadless axial bore and each mounting member has a threadless projection extending into one of said bores, the mounting members having shoulders limiting the position of said projections in said bores.

4. A tuned transformer unit as set forth in claim 2 and further including an insulating base, and a shield can on said base, one of said mounting members extending between the base and one of said ferromagnetic members, and another of said mounting members extending between the end of said can opposite the base and the other of said ferromagnetic members.

References Cited in the file of this patent

UNITED STATES PATENTS

| | | |
|---|---|---|
| 341,981 | Woolson | May 18, 1886 |
| 753,879 | Gregory | Mar. 8, 1904 |
| 1,769,021 | Gilling | July 1, 1930 |
| 1,958,508 | Audet | May 15, 1934 |
| 1,983,281 | Fries et al. | Dec. 4, 1934 |
| 2,111,490 | Jacob | Mar. 15, 1938 |
| 2,206,261 | O'Callaghan | July 2, 1940 |
| 2,229,989 | Roby | Jan. 28, 1941 |
| 2,403,349 | Dolberg | July 2, 1946 |
| 2,485,666 | Silber | Oct. 25, 1949 |
| 2,571,845 | Del Camp | Oct. 16, 1951 |
| 2,618,749 | Altenberger | Nov. 18, 1952 |